United States Patent
Cottrell

(10) Patent No.: US 10,807,325 B2
(45) Date of Patent: Oct. 20, 2020

(54) METHODS FOR COMBINING COMPONENTS OF VARYING STAGES OF CURE

(71) Applicant: AURORA FLIGHT SCIENCES CORPORATION, Manassas, VA (US)

(72) Inventor: Daniel Benjamin Cottrell, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 14/677,435

(22) Filed: Apr. 2, 2015

(65) Prior Publication Data

US 2015/0210019 A1 Jul. 30, 2015

Related U.S. Application Data

(62) Division of application No. 13/715,325, filed on Dec. 14, 2012, now abandoned.

(51) Int. Cl.
*B29C 70/84* (2006.01)
*B29C 70/44* (2006.01)
(Continued)

(52) U.S. Cl.
CPC ............ *B29C 70/84* (2013.01); *B29C 70/443* (2013.01); *B32B 37/06* (2013.01); *B32B 37/142* (2013.01);
(Continued)

(58) Field of Classification Search
CPC ....... B29C 70/84; B29C 70/443; B32B 37/24; B32B 37/142; B32B 37/06;
(Continued)

(56) References Cited

U.S. PATENT DOCUMENTS 6,520,706 B1 2/2003 McKague, Jr. et al.
6,527,894 B1 * 3/2003 Rocker et al. ................ 156/182
(Continued)

OTHER PUBLICATIONS

Fiberglass 101—The Basics retrieved from <http://centralfloridafieros.com/forum/index.php?topic=149.0;wap2> on Nov. 25, 2012.
(Continued)

*Primary Examiner* — Vishal I Patel
(74) *Attorney, Agent, or Firm* — Michael Stanley Tomsa; McAndrews, Held & Malloy, Ltd.; Eugene H. Nahm

(57) ABSTRACT

The present disclosure relates to a method of fabricating a composite structure using a pre-cured composite stiffener and a dry fabric component. In one example, the method includes the steps of: wrapping an adhesive film and a resin film around an edge of said pre-cured composite stiffener; inserting the edge of said pre-cured composite stiffener into a clevis of a dry fabric component to form a composite structure assembly; securing the pre-cured composite stiffener substantially perpendicularly to the base portion of the dry fabric component; and starting a consolidated infusion and cure process. The consolidated infusion and cure process applies a first temperature to the composite structure assembly for a first predetermined period of time to infuse the dry fabric component, and the increases the first temperature to a second temperature for a second predetermined period of time to cure the composite structure assembly.

19 Claims, 17 Drawing Sheets

(51) Int. Cl.
  *B32B 37/14* (2006.01)
  *B32B 37/24* (2006.01)
  *B32B 37/06* (2006.01)
  *B29L 31/00* (2006.01)

(52) U.S. Cl.
  CPC ......... *B32B 37/24* (2013.01); *B29L 2031/772* (2013.01); *B32B 2305/28* (2013.01); *B32B 2309/02* (2013.01); *B32B 2313/04* (2013.01); *B32B 2315/085* (2013.01)

(58) Field of Classification Search
  CPC .......... B32B 2309/02; B32B 2315/085; B32B 2305/28; B32B 2313/04; B29L 2031/772
  USPC ............................................. 156/182, 306.9
  See application file for complete search history.

(56) References Cited

U.S. PATENT DOCUMENTS

| | | |
|---|---|---|
| 6,589,472 B1 | 7/2003 | Benson et al. |
| 6,849,150 B1 * | 2/2005 | Schmidt ................. 156/285 |
| 6,911,175 B2 | 6/2005 | Benson et al. |
| 7,087,317 B2 | 8/2006 | Ehrstrom et al. |
| 7,625,510 B2 | 12/2009 | Ashton et al. |
| 7,681,835 B2 | 3/2010 | Simpson et al. |
| 7,712,488 B2 | 5/2010 | Goering et al. |
| 7,867,566 B2 | 1/2011 | Blanton et al. |
| 8,720,825 B2 | 5/2014 | Kismarton |
| 2003/0041948 A1 | 3/2003 | Bersuch et al. |
| 2003/0196741 A1 | 10/2003 | Burgess et al. |
| 2009/0247034 A1 | 10/2009 | Goering et al. |

OTHER PUBLICATIONS

Department of Defense Handbook: Composite Materials Handbook, vol. 5. Ceramic Matrix Composites, Jun. 17, 2002.
Umeco: Bloodhound SSC Product Sponsor, ACG Bloodhound SSC Flier A1, Sep. 2011.

* cited by examiner

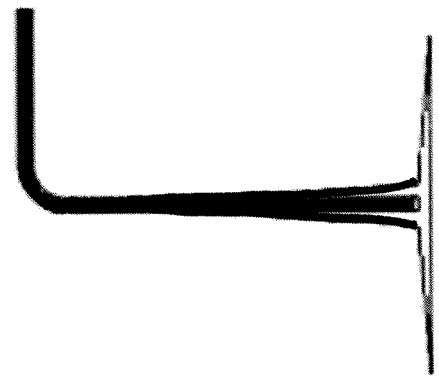
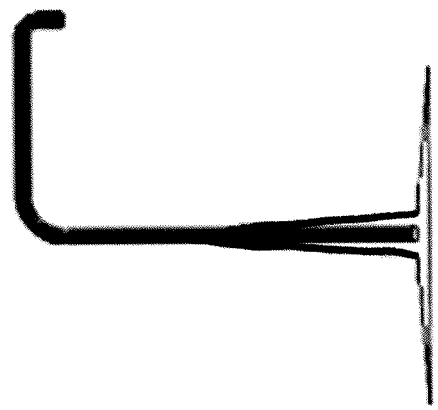
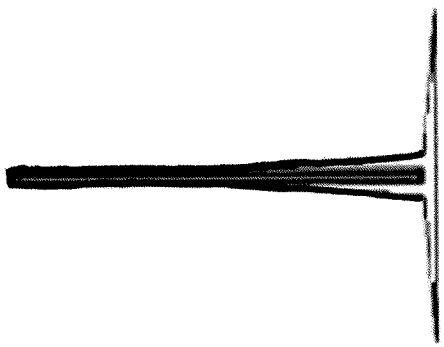

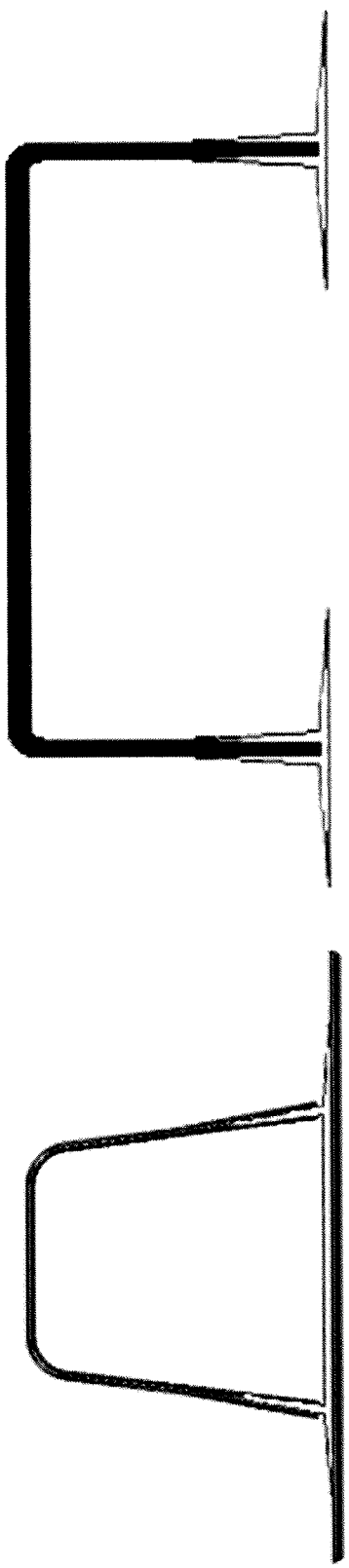
Figure 4d
Figure 4e
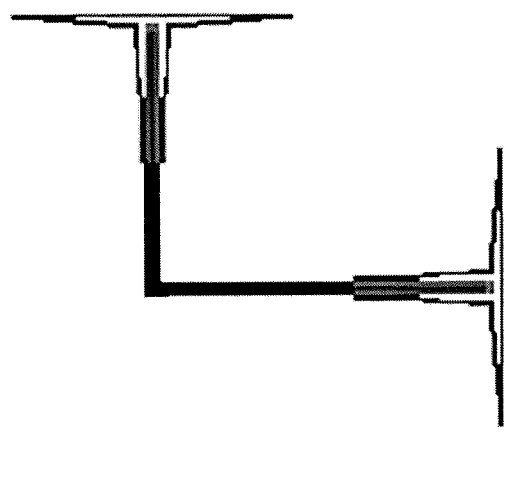
Figure 4h
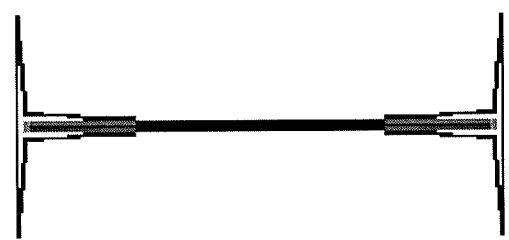
Figure 4g
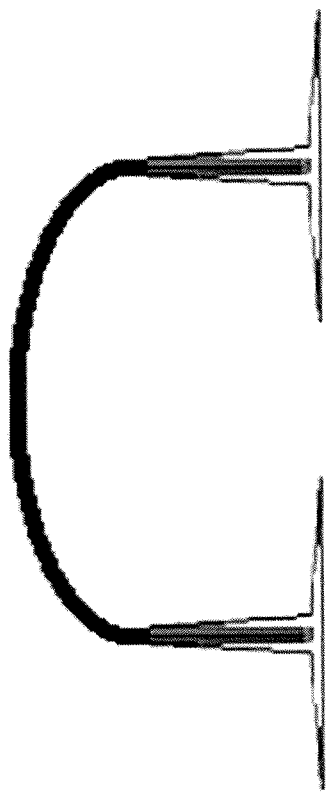
Figure 4f

METHODS FOR COMBINING COMPONENTS OF VARYING STAGES OF CURE

This application is a divisional of U.S. patent application Ser. No. 13/715,325, filed Dec. 14, 2012, the contents of which are incorporated herein by reference.

TECHNICAL FIELD

The present invention relates generally to composite materials. More particularly, the invention relates to methods for combining components of varying stages of cure and for creating unitized hybrid composite structures.

BACKGROUND INFORMATION

Over recent years, composite materials have become an increasingly desirable material for aircraft structures. Composite materials typically comprise strands of fibers (e.g., glass- and/or carbon-fiber) mixed with a resin. For example, many commercially produced composites use a polymer matrix material as the resin. In fact, there are many different polymers available, depending upon the starting raw ingredients. The more common polymer may include, for example, polyester, vinyl ester, epoxy, phenolic, polyimide, polyamide, polypropylene, and PEEK. During fabrication, fibers may be often wound, or woven, into a sheet of material and then impregnated (e.g., infused) with a resin. Once the fibers have been impregnated with a resin, the composite material may then be formed into the desired shape and cured until properly hardened.

Composite materials have an advantage of being extremely lightweight and having high strength. As a result, they are useful in, among other things, aircraft applications. Additionally, composite structures may be molded into desired shapes and configurations, thus eliminating the time and cost associated with fabricating shapes using traditional methods and materials. While many parts manufactured using composite materials could also be made from metal, a metallic part of the same strength and stiffness would be significantly heavier.

An example composite material is fiberglass, which consists of a matrix of glass-fiber, impregnated with a polymer resin. The glass-fiber provides tensile strength, but is flexible (like cloth). To provide rigidity, resin is used to lock the glass-fibers in place, thus resulting in a strong, relatively lightweight material that may be cut, drilled and otherwise manipulated while being resistant to moisture and chemicals.

An example group of composite materials includes carbon-based composites, which are strong and light fiber-reinforced polymers that contain carbon-fibers instead of glass-fiber. Examples of such carbon-based composites include carbon-fiber-reinforced polymers or carbon-fiber-reinforced plastics (CFRP or CRP). The polymer used to lock the carbon-fiber in place is typically an epoxy, but other polymers, such as polyester, vinyl ester or nylon, are sometimes used. Carbon-based composites may also contain fibers such as, for example, para-aramid synthetic fiber-reinforced polymers (e.g., Kevlar®), nickel, titanium, glass-fiber, as well as carbon-fiber and carbon nanotubes. Due to their strength and lightweight construction, carbon composites have many applications in both the aerospace and automotive fields.

Another example composite material is Glass Laminate Aluminum Reinforced Epoxy (GLARE). GLARE typically comprises several thin layers of aluminum interspersed with layers of glass-fiber "pre-preg" (i.e., "pre-impregnated" composite fibers where a material, such as epoxy is already present), bonded together with a matrix such as epoxy. Initially, pre-preg is flexible and sticky, but becomes hard and stiff once it has been heated (i.e., during the curing process). Although GLARE utilizes standard metallic materials such as aluminum, its manufacturing process, inspection and repair are more representative of other composite materials.

However, as recognized by U.S. Pat. No. 7,681,835 to Simpson et al., a drawback to certain composite materials is the actual assembly, or joining, of the composite materials. Unlike more traditional materials (e.g., metals), different considerations must be made for assembling composite materials. For example, placing holes in composite materials for attachment of fasteners severs the strands of fibers within the material and creates weak points within the material. While forming holes in the composite material by displacing the strands of the uncured fibers prevents severing of the fibers, this process is time-consuming and often impractical. Another alternative for assembling composite materials is the use of high-strength epoxies. Epoxies have an advantage of limiting the number of manufacturing steps. However, the distribution of the epoxy and the placement of the parts together can require expensive machines and numerous jigs (e.g., tooling). Moreover, such structures routinely involve multiple sets of tools, are very labor intensive, require several cure cycles and can require B-staged material with set expiration dates.

Therefore, there is a need in the art, for an improved method of combining, or joining, composite components of varying stages of cure that alleviates the aforementioned drawbacks.

SUMMARY

The present disclosure endeavors to provide methods for creating a unitized hybrid composite structure. The present disclosure also endeavors to provide a system and method for combining composite components of varying stages of cure and components of either similar or dissimilar materials.

According to a first aspect, a method of fabricating a composite structure from components of varying stages of cure comprises the steps of: providing a stiffener component; providing a dry fabric component; combining the stiffener component and the dry fabric component to form an assembly, wherein the stiffener component provides structural support to the assembly; infusing the assembly with resin to yield an infused assembly; and curing the infused assembly to yield a cured assembly.

According to a second aspect, a method of fabricating a composite structure from components of varying stages of cure comprises the steps of: providing a pre-cured composite stiffener; providing a dry fabric component having a base portion and a clevis configured to receive the pre-cured composite stiffener, wherein the clevis is substantially perpendicular to the base portion; wrapping a first resin film around a first edge of said pre-cured stiffener; inserting the first edge of said pre-cured composite stiffener into the clevis of the dry fabric component to form a composite structure assembly; applying a second resin film to a surface of the dry fabric component; securing the pre-cured stiffener substantially perpendicular to the base portion of the dry fabric component, wherein the pre-cured stiffener provides structural support to the composite structure assembly; infusing the composite structure assembly; and curing the composite structure assembly.

According to a third aspect, a method of fabricating a composite structure from components of varying stages of cure comprises the steps of: providing a pre-cured composite stiffener; providing a dry fabric component having a base portion and a clevis configured to receive the pre-cured composite stiffener, wherein the clevis is substantially perpendicular to the base portion; wrapping a first resin film around a first edge of said pre-cured stiffener; inserting the first edge of said pre-cured composite stiffener into the clevis of the dry fabric component to form a composite structure assembly; applying a second resin film to a surface of the dry fabric component; securing the pre-cured stiffener substantially perpendicular to the base portion of the dry fabric component, wherein the pre-cured stiffener provides structural support to the composite structure assembly; infusing the composite structure assembly by heating the assembly to a first temperature for a first period of time; and curing the composite structure assembly by increasing the heat to a second temperature, wherein the second temperature is greater than the first temperature.

According to a fourth aspect, a method of fabricating a composite structure from components of varying stages of cure comprises the steps of: providing a pre-cured composite stiffener; providing a dry fabric component having a base portion and a clevis configured to receive the pre-cured composite stiffener, wherein the clevis is substantially perpendicular to the base portion; wrapping a first film adhesive around a first edge of said pre-cured stiffener; wrapping a first resin film around the first edge of said pre-cured stiffener; inserting the first edge of said pre-cured composite stiffener into the clevis of the dry fabric component to form a composite structure assembly; applying a second film adhesive to a surface of the dry fabric component; applying a second resin film to the base portion of the dry fabric component; securing the pre-cured stiffener substantially perpendicular to the base portion of the dry fabric component, wherein the pre-cured stiffener provides structural support to the composite structure assembly; applying a film adhesive to the exterior base portion of the dry fabric component securing the pre-cured stiffener with dry fabric component to another substrate to which it will bond; infusing the composite structure assembly by heating the assembly to a first temperature for a first period of time; and curing the composite structure assembly by increasing the heat to a second temperature, wherein the second temperature is greater than the first temperature.

In certain aspects, the method may further comprise the step of bonding the cured assembly with a component to form a hybrid unitized structure.

In certain aspects, the stiffener component is fabricated from a composite material, a carbon-fiber composite material and/or metal.

In certain aspects, the dry fabric component may be a three-dimensional, woven pi-preform, wherein said pi-preform contains a clevis configured to receive an edge of the stiffener component.

In certain aspects, the method may further comprise the steps of: (i) wrapping a resin film around a first edge of said stiffener component; and (ii) inserting the first edge of said stiffener component into the clevis of said pi-preform.

In certain aspects, the method may further comprise the steps of: (i) wrapping a resin film around a second edge of said stiffener component; and (ii) inserting the second edge of said stiffener component into the clevis of the second pi-preform.

In certain aspects, the component comprises Glass Laminate Aluminum Reinforced Epoxy.

In certain aspects, the dry fabric component comprises at least one of: (1) glass-fiber; (2) carbon-fiber; or (3) para-aramid synthetic fiber.

In certain aspects, the stiffener component is (i) L-shaped or (ii) J-shaped.

In certain aspects, (i) the first temperature is between 150 and 200 degrees Fahrenheit, (ii) the second temperature is between 200 and 300 degrees Fahrenheit, (iii) the first period of time is between 10 and 25 minutes, and (iv) the second period of time is between 240 and 360 minutes.

In certain aspects, (i) the first temperature is about 175 degrees Fahrenheit, (ii) the second temperature is about 250 degrees Fahrenheit, (iii) the first period of time is between 15 and 20 minutes, and (iv) the second period of time is between 290 and 310 minutes.

BRIEF DESCRIPTION OF THE DRAWINGS

These and other advantages of the present invention will be readily understood with reference to the following specifications and attached drawings wherein:

FIGS. 4a through 4h illustrate cross-sectional views of example stiffener shapes and configurations;

DETAILED DESCRIPTION OF THE PREFERRED EMBODIMENTS

Figure 1:
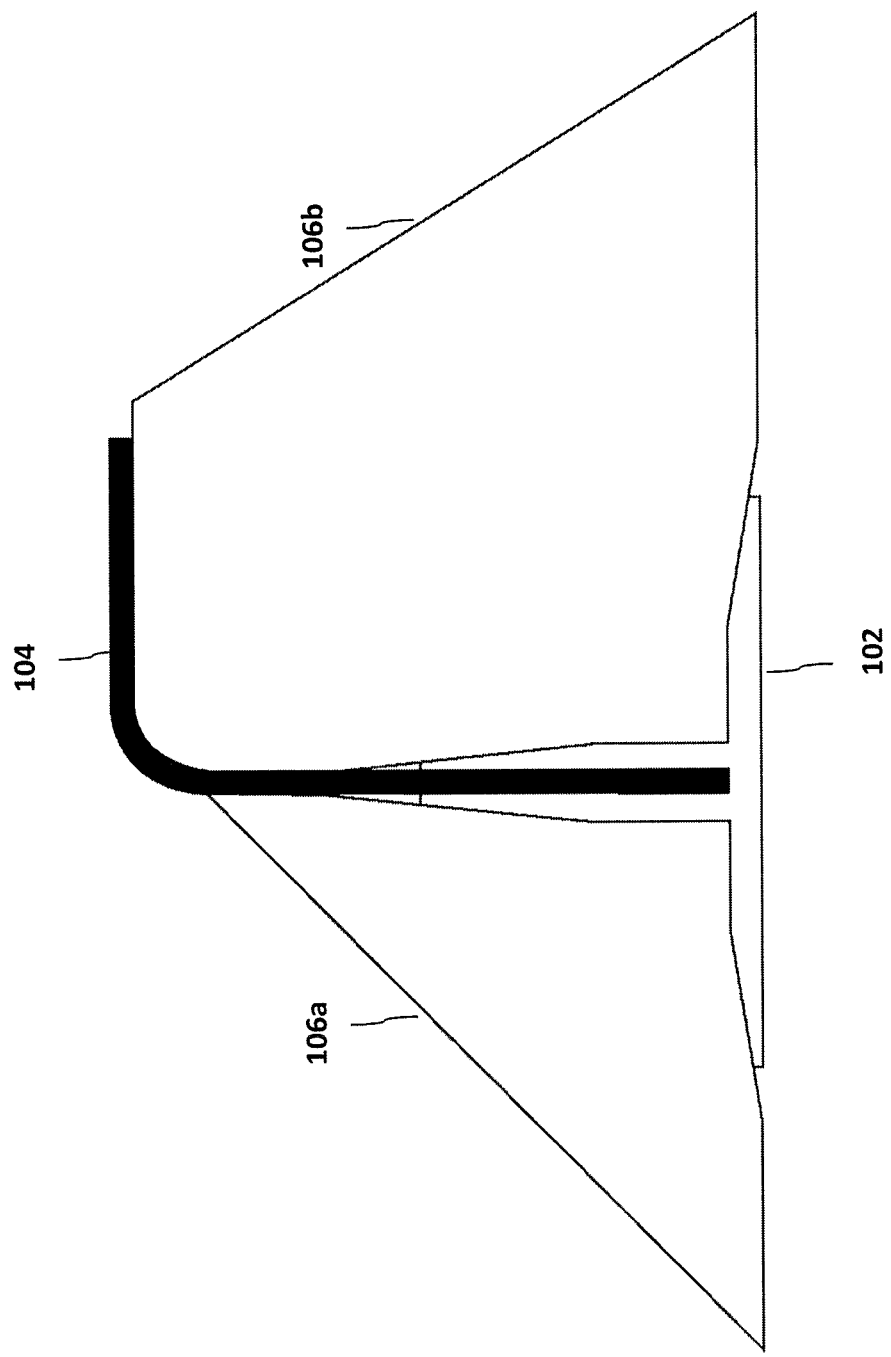
FIG. 1 illustrates a cross sectional view of an L-shaped stiffener with a pi-preform sandwiched between two different mandrel halves.

Preferred embodiments of the present invention will be described herein below with reference to the accompanying drawings. In the following description, certain well-known functions or constructions are not described in detail since they would obscure the invention in unnecessary detail. For this application, the following terms and definitions shall apply:

As used herein, the term "composite material" refers to material made from two or more constituent materials with different physical or chemical properties, including resin-fiber composites. Examples of such composite materials include fiberglass, carbon-fiber-reinforced polymers ("carbon-fiber"), Glass Laminate Aluminum Reinforced Epoxies (GLARE), para-aramid synthetic fiber-reinforced polymers (e.g., Kevlar®) and any other composite material known in the art of manufacturing aircraft, watercraft and land craft.

As used herein, the term "composite component" refers to an article fabricated from a composite material.

As used herein, the terms "cure" and "curing" refer to the process of transforming an initially liquid resin into its final rigid solid form.

As used herein, the terms "bond" and "bonding" refer to the process of joining two or more components, including, but not limited to, composite components.

As disclosed herein, it is an objective of the present invention to provide systems and methods for combining non-composite components and/or composite components of varying stages of cure. That is, structures that would normally require several cure steps or independent fabrications may instead be more efficiently fabricated. A consolidated infusion and cure cycle streamline the fabrication process by merging multiple steps into a single step, thereby reducing tooling, fabrication time, complexity of tools, oven run time, and potential contamination of individual components by consolidating processes. Moreover, a consolidated infusion and cure cycle extends the shelf life of components (e.g., expensive dry fiber components, such as three-dimensional woven pi-preforms) by not infusing (i.e., impregnating) them with resin until the time of cure, thus reducing overall costs and preventing damage to B-staged parts (e.g., parts that have undergone a partial cure).

Accordingly, a dry fiber component, such as a dry, three-dimensional woven fiberglass pi-preform, can be infused while simultaneously curing and bonding said dry pi-preform to other structures, such as previously cured composite structures. While a dry three-dimensional woven fiberglass pi-preform is described and illustrated, numerous other dry fiber components may be used, which may be of varying shapes and sizes, such as multi-spoked three-dimensional woven shapes (e.g., having multiple devises).

Previously cured structures, which include, but are not limited to, pre-cured stiffeners, can also function as tooling, thus eliminating the time and expense attributed to the additional tooling steps that would normally be required by the process. While a pre-cured carbon-fiber stiffener is described and illustrated in the various figures, other materials are contemplated and may be used in lieu of, or in conjunction with, carbon-fiber. Such materials include, for example, polymers, other composites, metals, plastics, nanomaterials, and ceramics.

Moreover, using a dry fiber component, such as a dry three-dimensional woven fiberglass pi-preform, provides the additional function of creating a barrier between the stiffener and composite structure. For example, a glass-fiber pi-preform may provide a barrier between an aluminum GLARE component and a carbon-fiber stiffener, thus reducing, or eliminating, the risk of corrosion that can result when such materials make contact with each other. Specifically, in cases where GLARE and a carbon-fiber are used, the barrier deters galvanic corrosion. Similarly, a glass-fiber pi-preform may act as an insulator and/or isolator between the carbon fiber and aluminum surface of the GLARE. More specifically, in cases were electrical power and/or signals may be carried through the conductive carbon fiber structure, the fiber-glass prevents shorting to the aluminum of the GLARE by acting as an electrical insulator and/or isolator.

Using prior methods, such infusion processes would have required a separate set of tooling to: (i) orient and retain the pi-preforms; and (ii) allow sufficient saturation of the fibers without destroying the geometry. This tooling is often used only for infusion and is therefore unnecessary after the infusion process is complete. Indeed, using prior processes to manufacture a component having a glass-fiber pi-preform and carbon-fiber stiffener would have required substantially more steps, time and expense. For example, a single-piece pi-preform with carbon-fiber stiffener would have been made by (1) curing the carbon-fiber stiffener, (2) infusing the pi-preform, (3) curing the pi-preform, and (4) then finally bonding the carbon-fiber stiffener to the glass-fiber pi-preform. Moreover, during that process, unique tooling would have been required to infuse the pi-preform. Furthermore, after infusion, infused preforms (e.g., pi-preforms) would be much harder to handle due to the added stiffness and tackiness of the resin. Finally, infusion was typically done per order which also meant that pi-preforms were delivered, with an expiration date based on the resin.

The present system and method overcomes these deficiencies by consolidating several of the manufacturing processes to increase the speed and efficiency of fabrication while reducing the necessary tooling required for the finished product. For example, a carbon-fiber stiffener may be pre-cured and configured to function as a backbone and/or support during a consolidated infusion, cure and bond process. With the assistance of mandrels that can be used during other phases of manufacturing, pre-cured carbon-fiber stiffeners may be bonded with a dry fiber component (e.g., a pi-preform) to function as part of the tooling used during infusion, thereby providing a seamless transition from infusion to cure. In essence, the present method effectively consolidates what would normally require at least two curing steps, one of which includes a separate infusion step, and a bonding step into only two curing steps, therefore eliminating at least one iteration of infusion and tooling, while also decreasing the overall fabrication time and cost. It is generally advantageous to eliminate these more traditional secondary bonding steps because they require more prep work on components before assembly as well as more tolerance on individual parts/tools for assembly and/or differing adhesives, which could negatively affect the final properties of the unitized structure. In addition, simultaneously curing a multi element component as one unit reduces the amount of extra/scrap material that often results when components are separately cured and bonded/assembled. For example, using prior techniques, bonding two cured components would likely require that the components be trimmed to the exact shape needed before using additional tooling to jig the components into place and then bond them together. This step is omitted using a consolidated infusion and cure cycle as disclosed herein.

In the consolidated infusion and cure cycle, resin film may be applied directly to the dry fiber component and stiffener. With the assistance of a mandrel, additional pressure may be provided during the consolidated infusion and cure cycle of the component fabrication. By controlling the oven temperature, the consolidated infusion and cure cycle allows for resin to flow into the dry fiber component (infusion/impregnation) and then cures the impregnated fiber component by increasing the temperature while simultaneously bonding the impregnated fiber component with the stiffener. This consolidated infusion and cure cycle saves time (e.g., requiring fewer cure cycles and fabrication steps) and reduces tooling (e.g., eliminates infusion tooling and reduces cure tooling), and reduces wasted material (dry components are infused at time of fabrication rather than when initially manufactured for which they are given an expiration date) which reduces the overall cost of production for a component.

A consolidated infusion and cure cycle may be accomplished using, for example, resin film and film adhesive in addition to a dry fiber component, such as a three-dimensional woven fiberglass pi-preform, and pre-cured composite stiffeners, such as carbon-fiber stiffeners. To achieve a desired resin content by weight, different resin film weights may be applied along certain faces of the pi-preform. Moreover, film adhesive may be applied to the portion of the carbon-fiber stiffener residing inside the clevis of the pi-preform to aid in adhesion/bonding to one and other during cure. Opposed to a film adhesive, which typically has a carrier lattice imbedded in the adhesive sheet, allowing it to act slightly more like a fabric, a resin film need not have an embedded carrier and is a free-form sheet of a tacky semi-fluid resin film.

Fabrication of the stiffeners, both blade (i.e., substantially flat) and other configurations, such as those depicted in FIGS. 2a through 2g, may be fabricated using shaping tools, molds and pre-preg composite layup techniques known to those of ordinary skill in the art. The stiffener used to provide support for the infusion, cure, or bonding of additional components should not be limited to composite materials such as carbon-fiber, but could be manufactured from any material that provides the required stiffness to the assembly at the time of infuse, cure, and/or bond. The dry fiber component, including three-dimensional woven fiberglass pi-preforms, may be fabricated from, for example, S-Glass and infused with resin. S-Glass is generally used for polymer matrix composites that require improved mechanical properties compared to E-glass-based composites. This is often the case when the material is operated under more extreme conditions. FIG. 1 provides a cross-sectional view of an example pi-preform 102 and L-shaped stiffener 104 sandwiched between two mandrel halves 106a, 106b. U.S. Patent Publication No. 2009/0247034 to Goering discloses additional example pi-preforms.

A consolidated infusion and cure cycle enables users to produce infused and fully-cured pi-preforms on an as-needed basis. This is advantageous because, while the resin film itself has a finite lifespan and will eventually expire, it is a small fraction of the cost of dry fiber components, such as three-dimensional woven pi-preforms. By infusing the pi-preforms as needed, remaining dry fiber components may be stored indefinitely until needed and only require an in-date (i.e., not expired) batch of resin film at the time of cure. This consolidated infusion and cure cycle may also be applied to other pre-manufactured dry composite materials of any number of shapes.

To provide an overview, the present invention may be illustrated by the following example, which is provided to aid in the understanding of the invention and is not to be construed as a limitation thereof.

Example 1

Figure 2B:
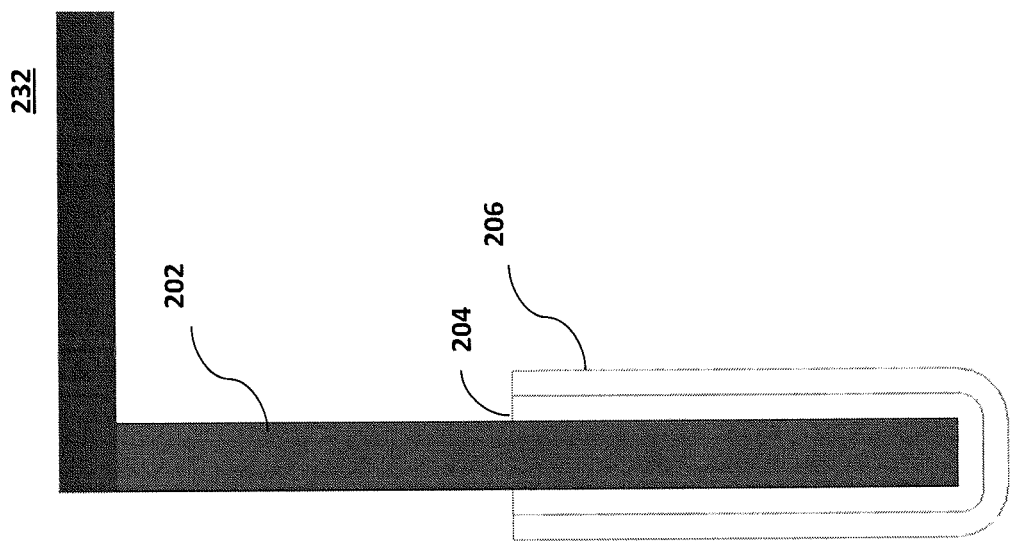
FIGS. 2a through 2i illustrate a first example infusion and cure process using a pre-cured stiffener and a pi-preform.
Figure 2A:
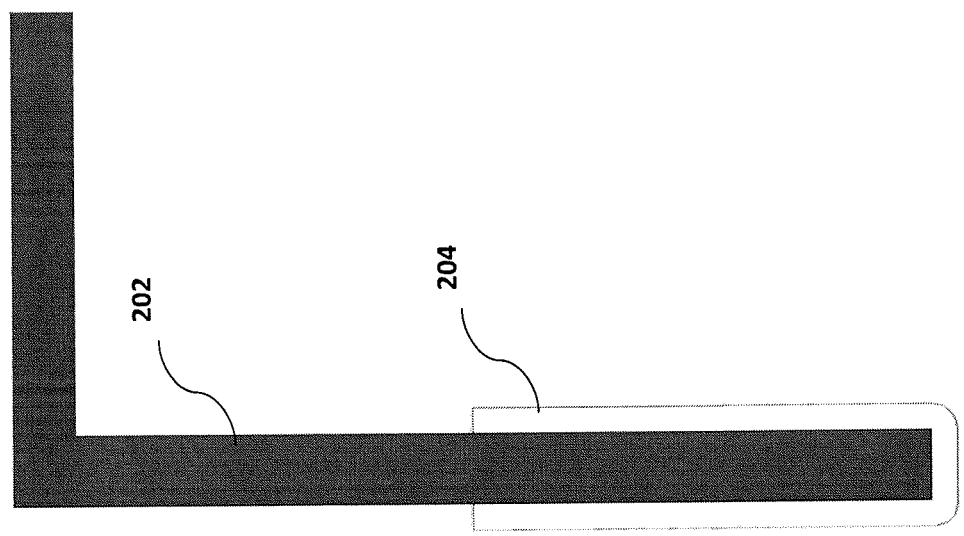
Figure 2C:
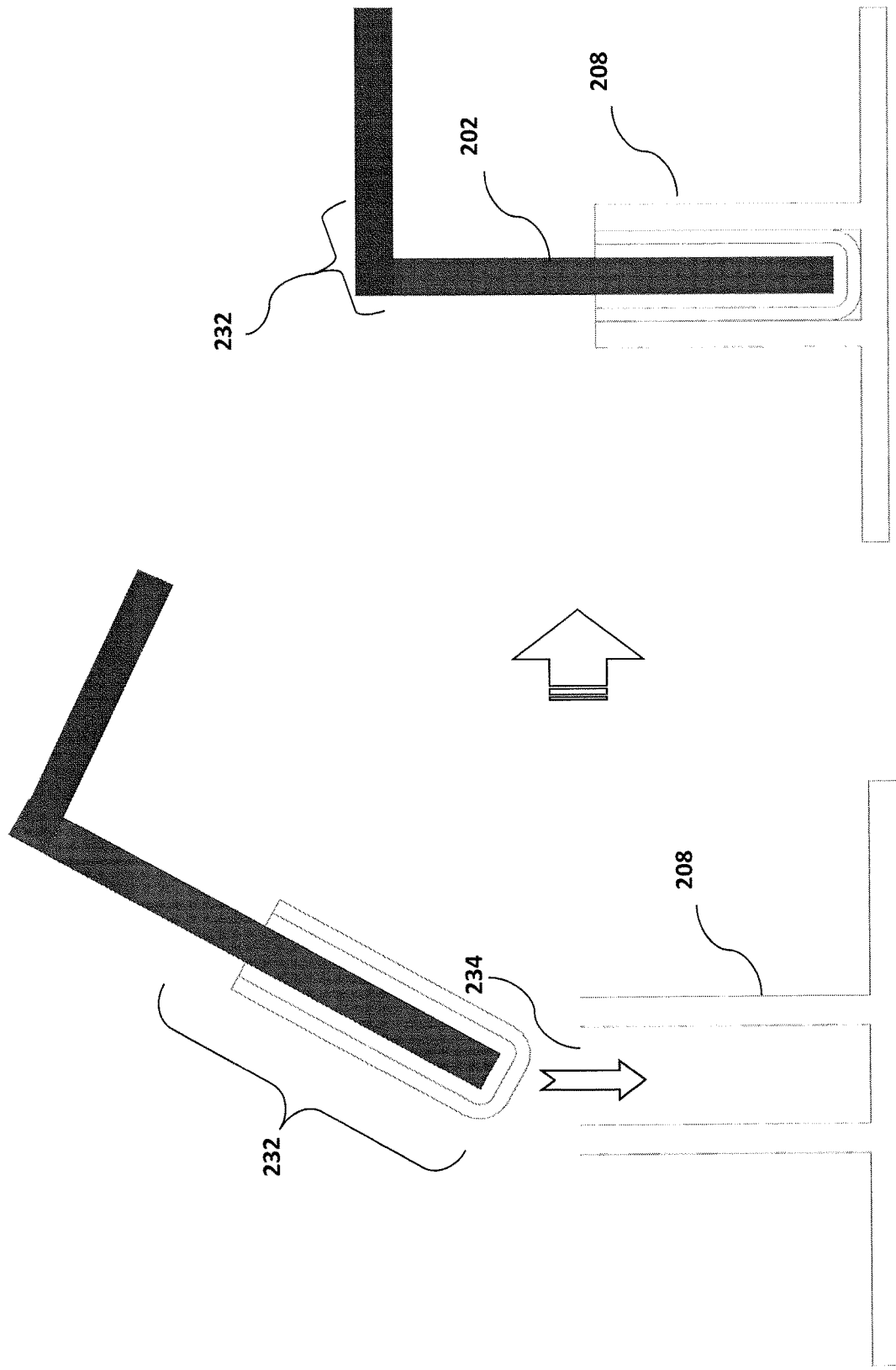

FIGS. 2a through 2i illustrate a first example consolidated dry fiber component infusion and cure process using a composite stiffener. Specifically, as illustrated, a pre-cured L-shaped stiffener 202 may be fused with a dry fiber component, such as pi-preform 208. FIG. 2a illustrates a first step wherein the bottom edge portion (e.g., about 0.5 inches) of a pre-cured stiffener 202 is wrapped with a film adhesive 204. FIG. 2b illustrates a second step wherein a resin film 206 is wrapped around the bottom edge portion of the pre-cured stiffener 202 (i.e., on the film adhesive 204) to form a stiffener subassembly 232. The film adhesive 204 can function to create a superior bond between the pi-preform 208 and the stiffener 202. FIG. 2c illustrates a third step wherein the wrapped edge of the stiffener subassembly 232 is inserted into an open clevis 234 of a pi-preform 208.

Figure 2E:
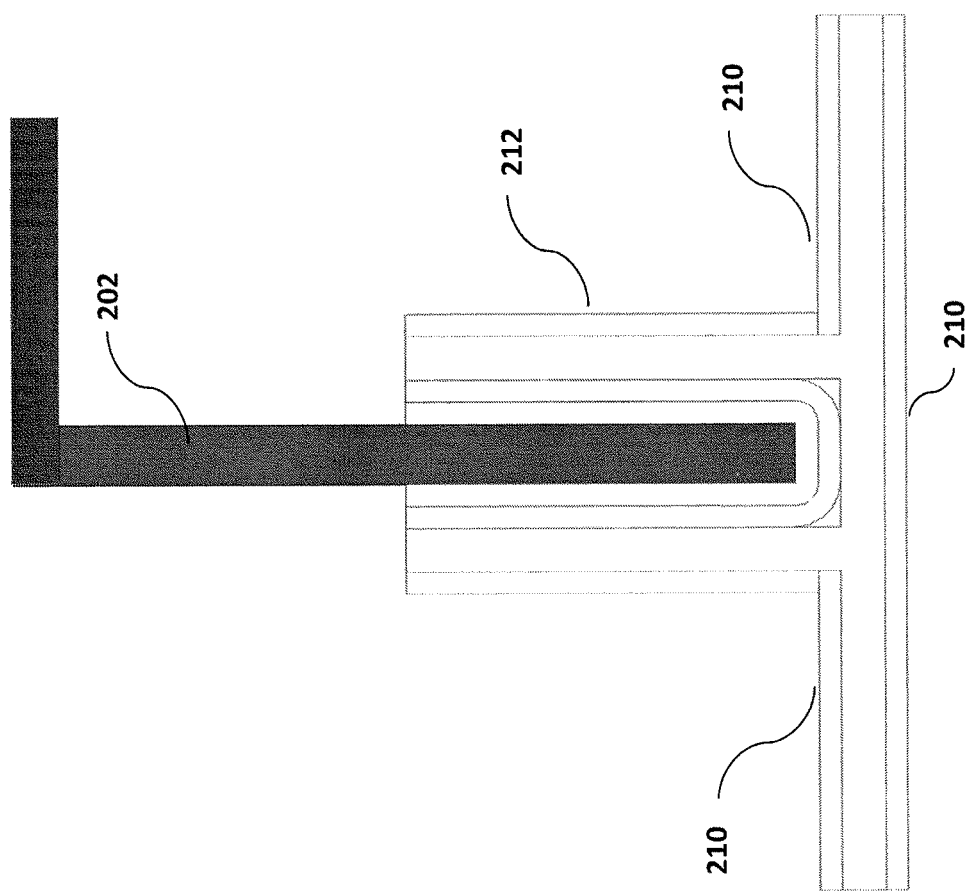
Figure 2D:
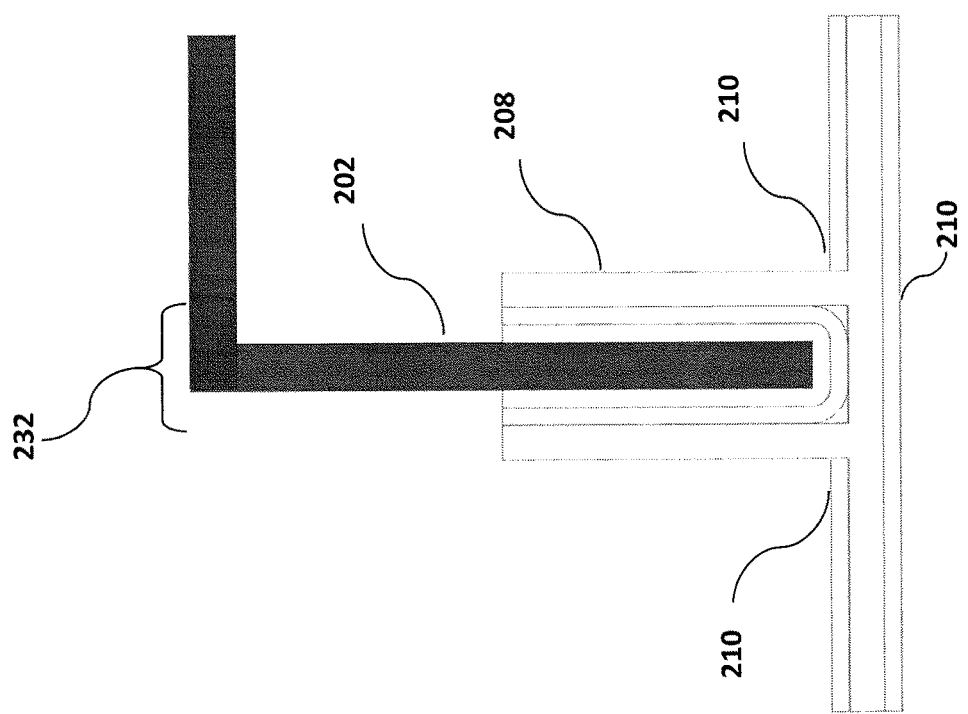
Figure 2G:
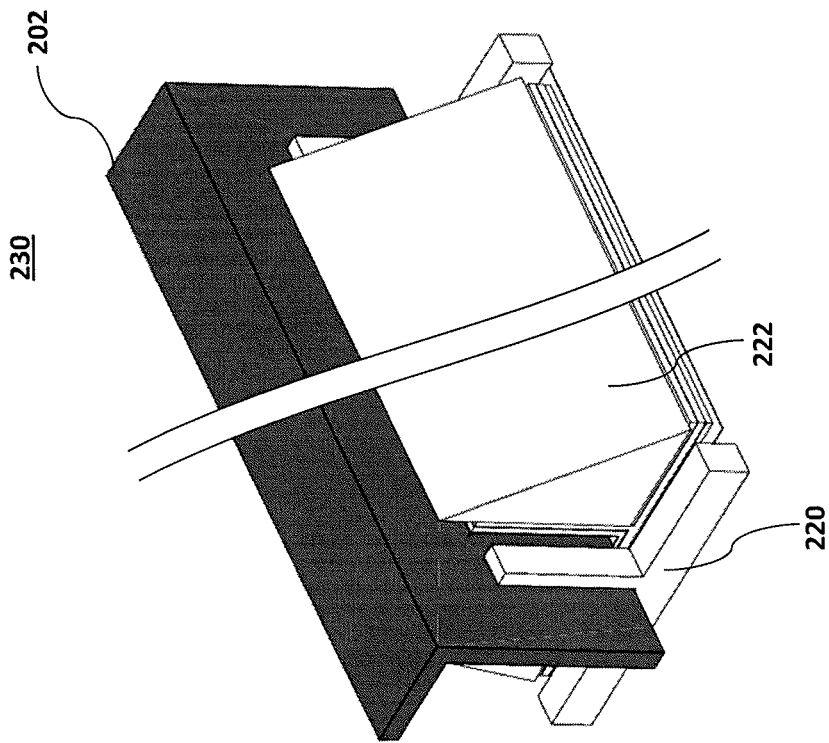

FIG. 2d illustrates a fourth step wherein a resin film 210 is applied to the top and bottom of the pi-preform 208's base. The weight of the resin film 210 may be adjusted to achieve a desired resin weight content of the final cured product. FIG. 2e illustrates a fifth step wherein a second resin film 212 is applied to the exterior of the pi-preform 208's clevis. As illustrated, the first and second resin films 210, 212, which may be of different weights, are added to the various faces of the pi-preform 208. Specifically, the resin film 212 may be applied to the vertical faces of the pi-preform 208 while the resin film 210 is applied to all horizontal faces. Depending on the application, the various film weights may be tailored to provide a specific percent resin weight of the final cured composite. Accordingly, this specific percent resin weight may vary from application to application, but may fall within, for example, the 30-40% resin content weight range. To ensure that the complete pi-preform 208 is fully saturated with resin, and to aid in ease of fabrication, resin film may be overlapped in each of the exterior corners where the clevis meets the base of the pi-preform during dry pi-preform layup.

Figure 2F:
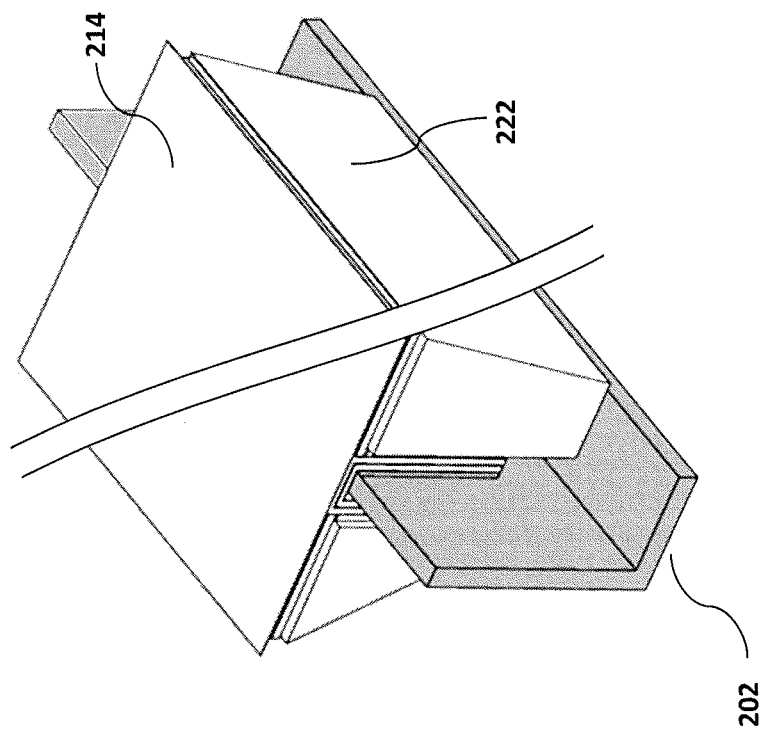

FIG. 2f illustrates a sixth step wherein a peel ply 214 is applied to the pi-preform 208's base. The peel ply 214 provides a prepared bonding surface during later manufacturing. It may be preferable to cut the peel ply 214 larger (e.g., about 0.25 inches larger) than the base of the pi-preform 208, thereby aiding in applying the peel ply by requiring decreased accuracy while still covering the intended area. However, superfluous peel ply should be minimized as it can absorb additional resin, thus affecting the final resin percent by weight of the cured product. While a pi-preform 208 is illustrated, depending on the application, the stiffener assembly 232 may be inserted in, or bonded with, other dry fiber components and therefore should not be limited to the illustrated pi-preform type.

Figure 2I:
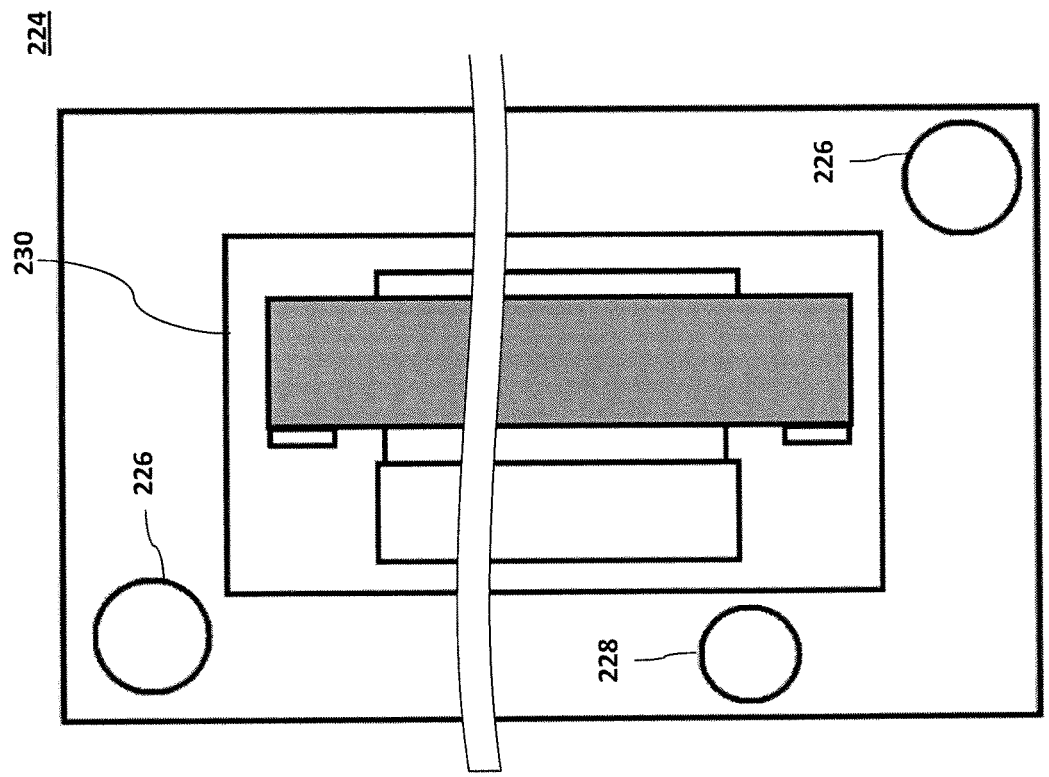

The rigidity of the stiffeners 202 may be increased by implementing geometric features (e.g., "L", "J", "Hat", etc.) or increasing the thickness of the stiffeners. An advantage of employing a L-shaped stiffener 202, or other geometric shape, is that tooling is not required. Specially, additional tooling, which is often used to provide stiffness/straightness along the stiffener's length, may be omitted, thereby eliminating any associated set-up time and expense. Mandrels may be used to perpendicularly orient the stiffener to the dry pi-preform while providing uniform pressure during infusion/cure but may not be required. For example, as FIG. 2i illustrates, a mandrel half 222 may be configured on each side of the pi-preform 208's clevis. The mandrels 222, may be used to apply pressure to the pi-preform stiffener assembly to ensure resin flows into the crevices and corners of the pi-preform 208 during infusion. The mandrels 222 may be used for infusion, cure, and bonding of the pi-preform components and bonded joints. These mandrels can assist in providing additional support for the composite structures as well as applying uniform pressure. The mandrels 222 may also be used to apply uniform pressure along the faces of the pi-preform and into the corners. To prevent unwanted adhesion, the stiffeners 202 may be covered in a release film between the laminates and the mandrels 222.

Figure 2H:
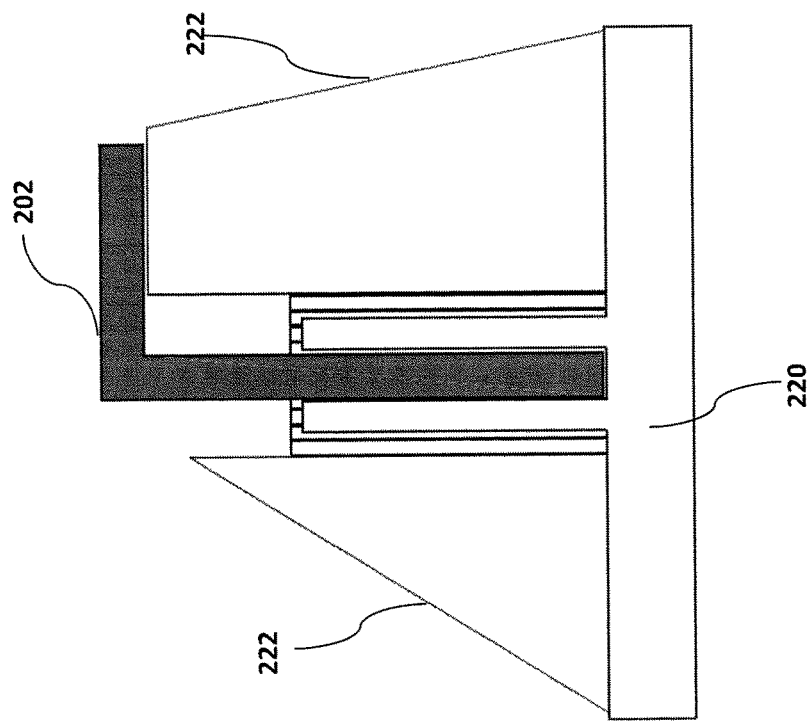

FIG. 2h illustrates a cut-away side view of a final assembly. FIG. 2i illustrates a pi-preform stiffener assembly in a traditional vacuum bagging assembly 224. For example, the vacuum bagging assembly 224 may comprise a plurality of vacuum ports 226, a reader port 228, and a breather fabric 230, which may be laid down around the pi-preform stiffener assembly as well as with paths to the vacuum ports 226. The final assembly may then be bagged and put under vacuum to apply pressure during the infusion/cure processes. The vacuum bag may then be placed into an oven which heats the material, causing the resin in the resin film and/or pre-preg to change from sticky and soft to hard and stiff. Providing pleats in the bag can enable uniform distribution of the vacuum pressure along the mandrels 222 and into the pi-preform stiffener assembly. The use of breather fabric 230 around the perimeter of the pi-preform stiffener assembly allows air pathways to the vacuum ports 226 to create as much pressure as possible on and around the part without allowing the back to choke off sections of the layup.

Depending on the size and shape of the manufactured component, the cure cycle may be tuned to allow full infusion of the resin prior to cure. Specifically, the oven temperature and time for infusion may be set to a specific temperature at which point the resin retains a fluid state allowing it to saturate the dry material. This temperature may differ depending on the resin/epoxy matrix being used; and the time required for it to fully permeate the dry fibers may also vary. In one case, where the resin may cure around 250 degrees, the infusion temperature may be around 175 degrees. Where the cure time may be 250-360 minutes the infusion time may be 10-25 minutes. The stiffeners 202 may be cured on flat plate aluminum to provide a smooth, flat base to the pi-preform, however, due to the benefit of the use of dry fiber components being infused during the curing, this process can be employed on any type of surface of varying curvature (for example the skins and leading edge of the interior of a wing). Once the component is fully infused and saturated with the resin matrix, the temperature can then be increased to a point at which curing will occur. Once cured, the oven may be decreased to ambient temperature. Therefore, an advantage of using the methods described herein is that the composite assembly may essentially be simultaneously infused and cured. That is, unlike prior methods, the composite assembly may go from infusion to cure by simply increasing the temperature of the oven, thus eliminating unnecessary tooling and the costs usually associated with the transition from infusion to cure.

Example 2

Figure 3B:
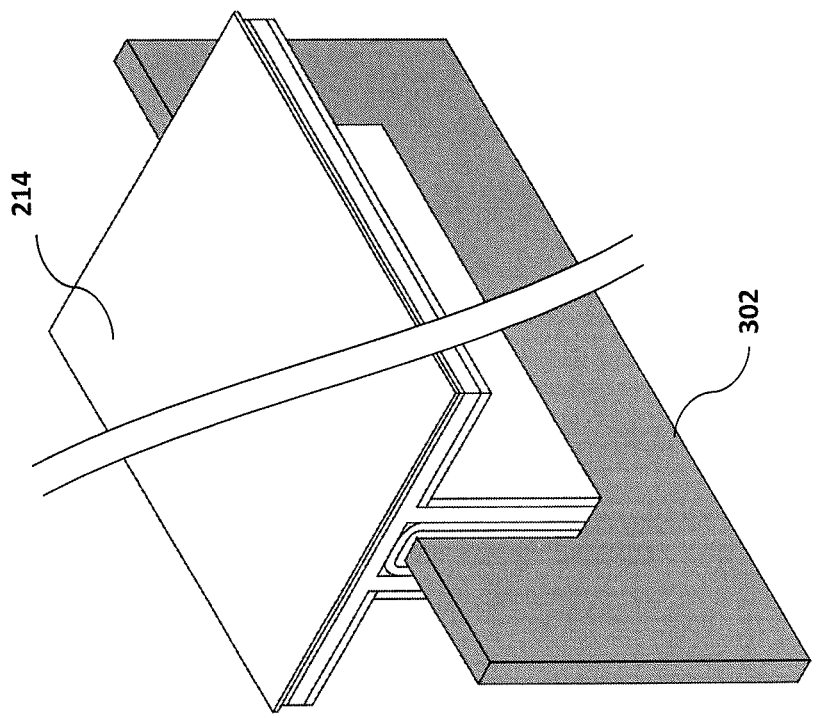
FIGS. 3a through 3f illustrate a second example infusion and cure process using a pre-cured stiffener and a pi-preform.
Figure 3A:
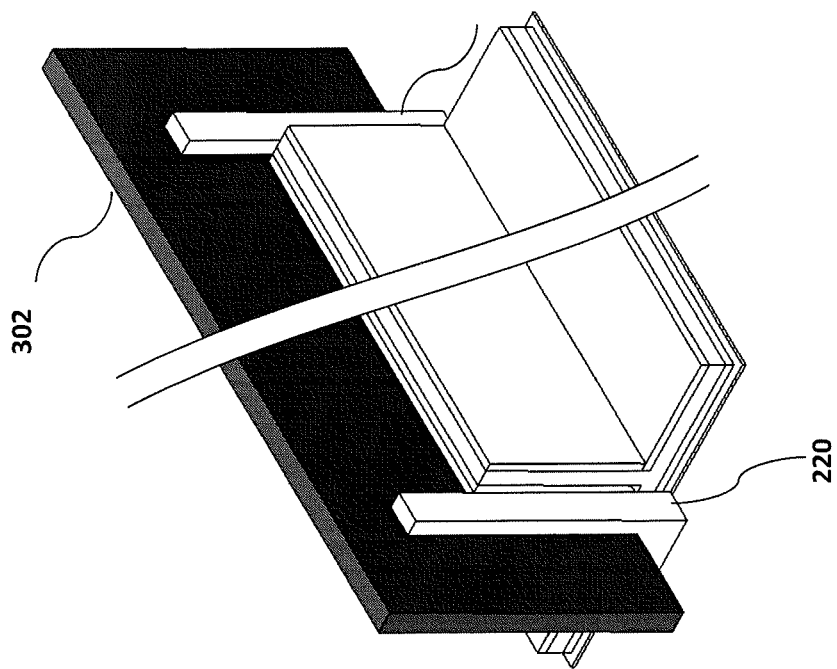
Figure 3D:
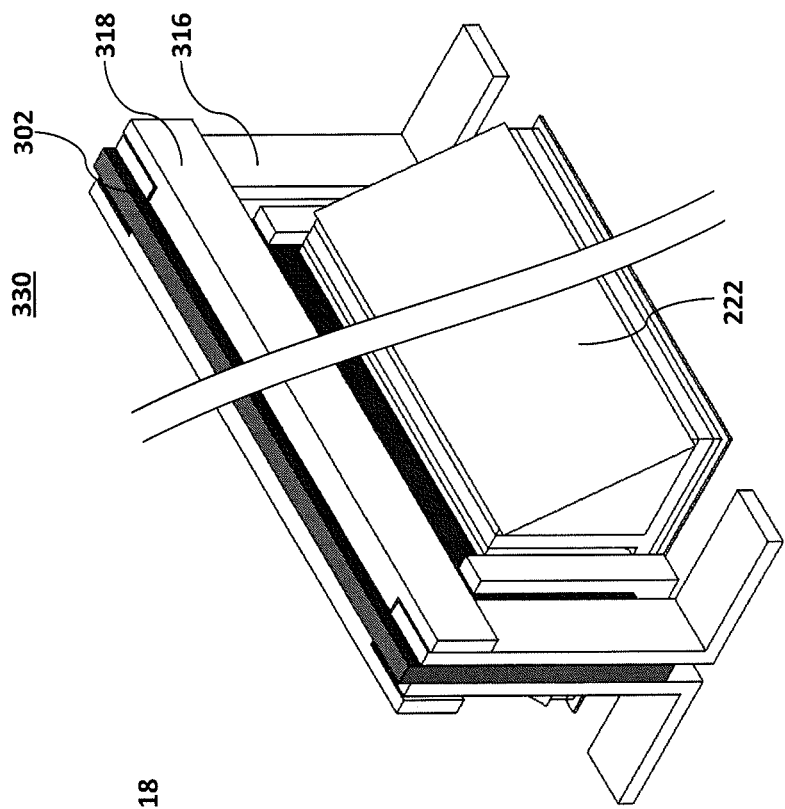
Figure 3C:
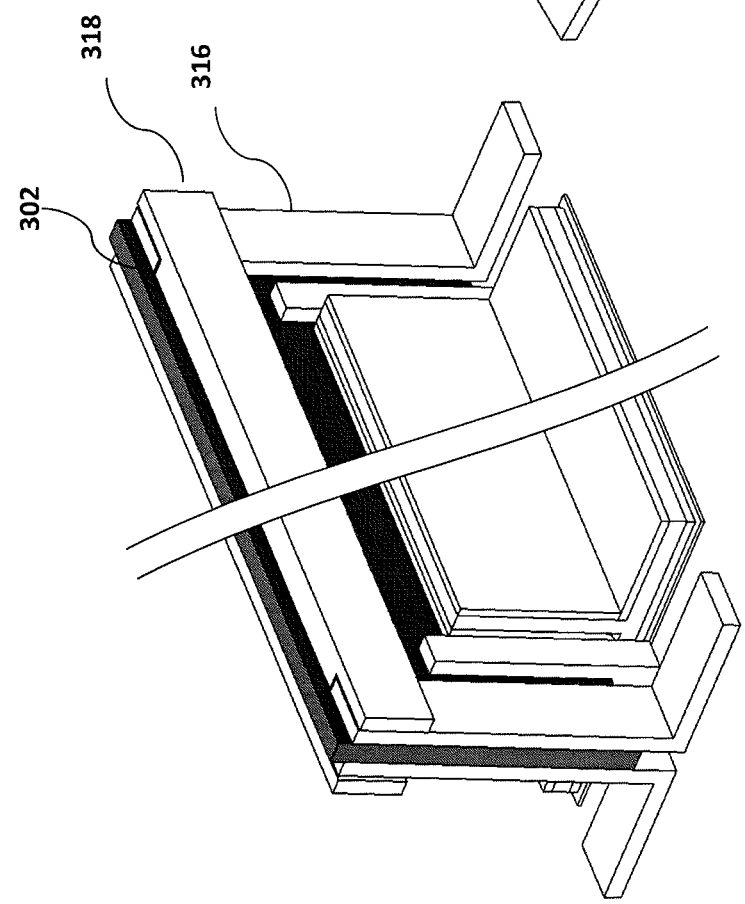
Figure 3F:
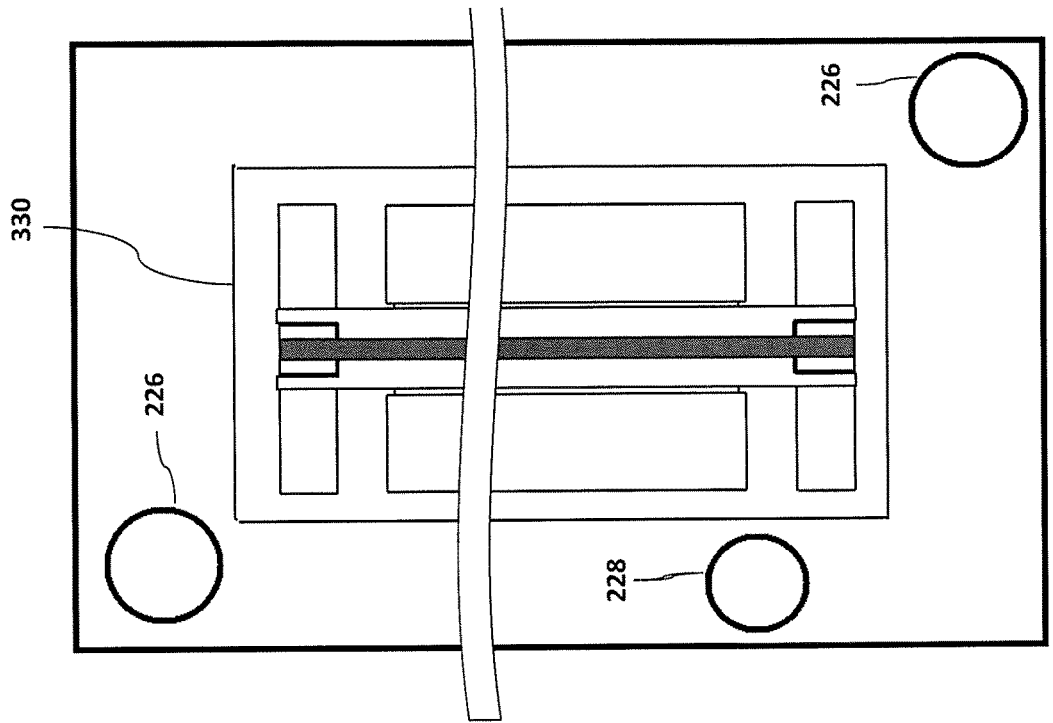
Figure 3E:
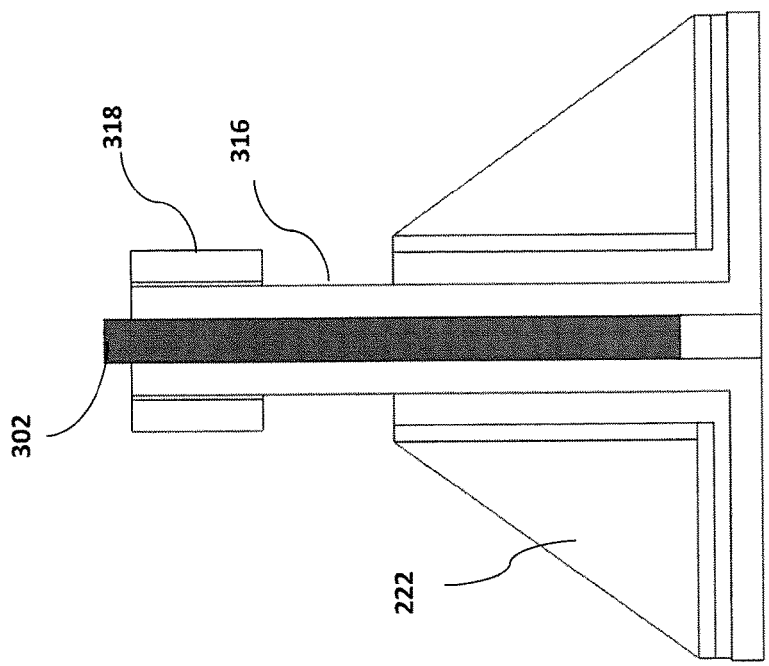

The process of Example 2 is substantially the same as the process of Example 1. However, in certain situations stiffeners 302, such as the blade-shaped stiffener illustrated in FIG. 3a, may be employed in lieu of stiffeners having geometric shapes. Unfortunately, such blade-shaped stiffeners may not be sufficiently stiff to keep the stiffener structure straight along the length of the assembly. For example, where a blade-shaped stiffener is too thin and/or must span a greater distance. Thus, unlike Example 1, tooling angles 316 may be further employed to keep the blade-shaped stiffeners 302 vertical while the lengthwise clamps 318, which may be attached (e.g., bolted) to the angles 316, can keep the whole assembly straight along its length. Specifically, as illustrated in FIGS. 3c and 3d, a clamp 318 may be configured to span the length of the to-be-cured components to keep the blade-shaped stiffener 302 substantially straight along its length. The various tooling may be fabricated from materials known in the art, such as aluminum. For example, FIG. 3c illustrates a step wherein tooling angles 316 are used to clamp the ends of the overhanging stiffener 302 to keep it vertically straight. In other words, tooling angles 316 may be used to position the blade-shaped stiffener 302 vertically inside its clevis 234, keeping it substantially perpendicular to the pi-preform 208's base. As with Example 1, the size, shape and length of the blade-shaped stiffener 302 may be increased or decreased to fulfill a particular application.

While FIGS. 2a through 2i and 3a through 3f illustrate two example stiffener shapes (i.e., "L" 202 and "Blade" 302), the above-described methods may be applied to stiffeners of various shapes, forms and sizes. For example, FIGS. 4a through 4h provide a plurality of cross-sectional views of example stiffener shapes and configurations. Specifically, FIG. 4a illustrates the above-mentioned blade-shaped stiffener. FIGS. 4b and 4c illustrate J-shaped and L-shaped stiffeners, respectively. As noted above, by increasing geometry (e.g., providing additional bends or curves in the stiffener), rigidity can be increased thereby eliminating the need to use additional tooling. Additionally, while the blade-shaped, the L-shaped and the J-shaped stiffeners of FIGS. 4a through 4c have a single contact point and thus use only a single pi-preform 208, additional pi-preforms 208 may be implemented to facilitate additional shapes having multiple contact points, thus further increasing strength and/or rigidity. For example, the stiffener may be bent into a narrow or wide U-shape and connected to a substrate using two pi-preforms 208. This is exemplified in FIGS. 4d, 4e, 4f, 4g and 4h, which illustrate hat-shape, wide hat-shape, hemispherical-shape, vertical bracket and a corner bracket configurations, respectively. In addition, as illustrated in FIGS. 4g and 4h, a stiffener may be configured to connect parallel or perpendicular surfaces, which may be advantageous in applications such as airfoil fabrication.

One or more pi-preform stiffener assemblies may be used to provide rigidity and strength to composite components, such as those fabricated from GLARE. Thus, pi-preform stiffener assemblies may be bonded to a bonding surface using paste adhesive. To enhance bond strength, a composite material bonding surface may be scuffed using an abrasive pad, and then wiped with, for example, acetone. Once prepared, the composite material bonding surface may sit for a period of time (e.g., about one hour) prior to bonding to ensure that, for example, all fluid has fully evaporated. Any peel ply applied to the base (i.e., underside) of the pi-preform stiffener assembly should be removed just before bonding, thus preserving the surface until bonding. When bonding the components, paste adhesive should be mixed thoroughly and applied to each component of the bond (e.g., the bonding surface and the pi-preform stiffener assembly). The GLARE surface may be wetted out with a very thin layer of adhesive, while adhesive may simultaneously be applied to the base of the pi-preform stiffener. An adhesive spreader may be used to uniformly spread the adhesive. Glass beads premixed into the adhesive help to control bond line thickness. The silicone mandrels used during cure of the stiffeners may also be used to apply uniform pressure during the bond. The pi-preform stiffener assembly and GLARE bonding surface may be left to cure at room temperature under vacuum (typically at 25-27 inHg) for up to 24 hours. Heat may be applied in some cases to accelerate curing of the adhesive.

During the curing process, mandrels, like those used during cure of the pi-preform stiffeners, may be used to apply uniform pressure from the vacuum. The only addition to this procedure may be to add flash tape placed approximately 0.25" from the edge of the pi-preform base. This flash tape could later be removed once the adhesive cured; taking with it any additional squeeze-out from the bond leaving a precise edge along the length of the bonded parts, while still allowing the paste adhesive to feather from the discrete edge of the pi-preform stiffener down to the GLARE.

Figure 5:
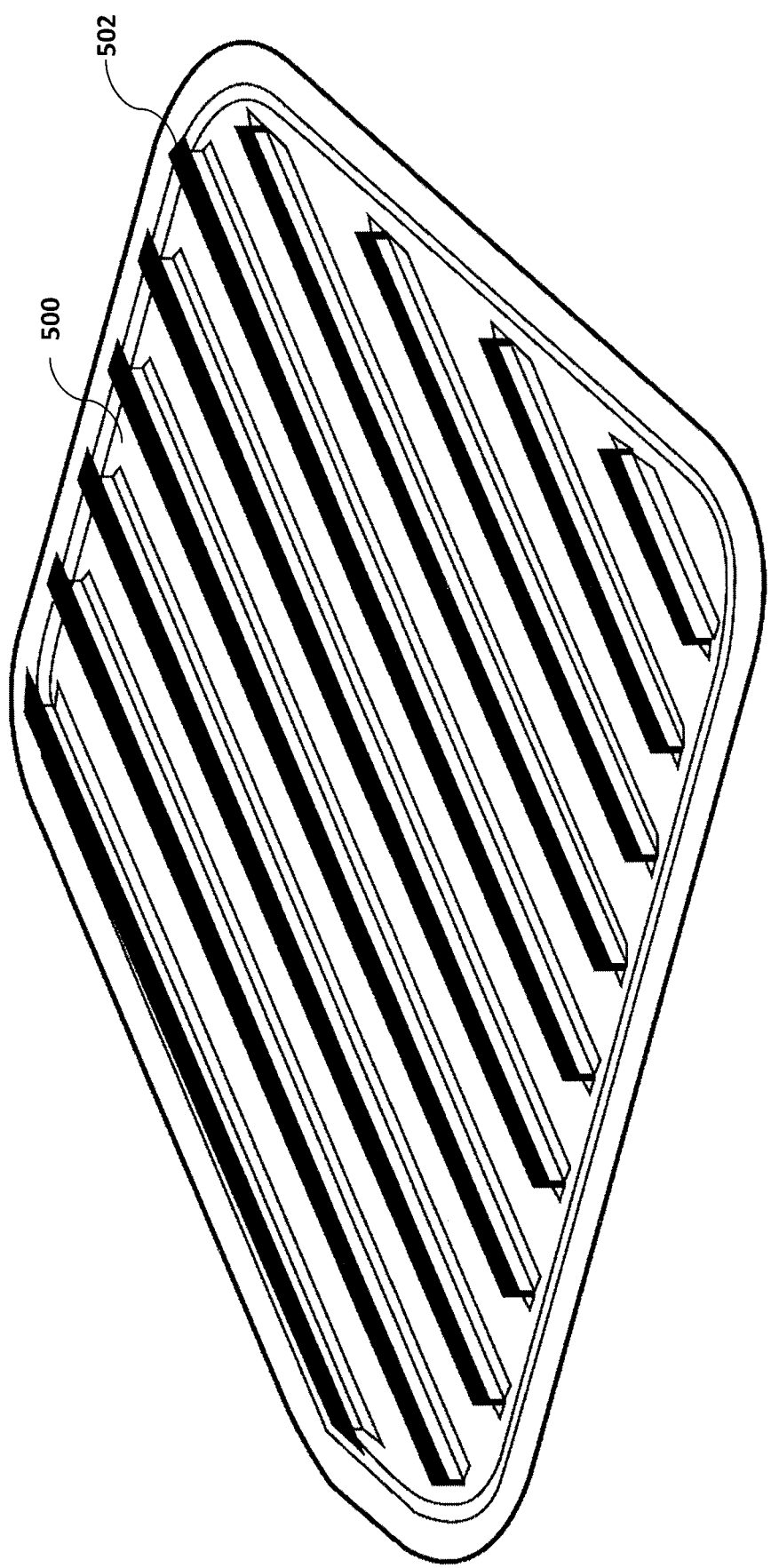
FIG. 5 illustrates a first example unitized hybrid structure wherein a plurality of pi-preform stiffener assemblies are used to provide rigidity and strength.

FIG. 5 illustrates an example unitized hybrid structure wherein one or more pi-preform stiffener assemblies 502 are used to provide rigidity and strength to a composite hatch of the Aircraft's access panel 500. The composite hatch panel 500 may comprise a composite material such as, for example, GLARE. To stiffen the panel, pi-preform stiffener assemblies 502, which may be approximately 1.0" wide by 0.5" tall with a four-ply L-shaped stiffener, may be bonded spanning the hatch panel. As one of skill in the art would recognize, the size of the pi-preform stiffener assemblies 502 may be adjusted for a particular purpose. The L-shaped stiffener may be made from, for example, four-ply (45/0/0/45) cloth carbon-fiber pre-preg.

Figure 6A:
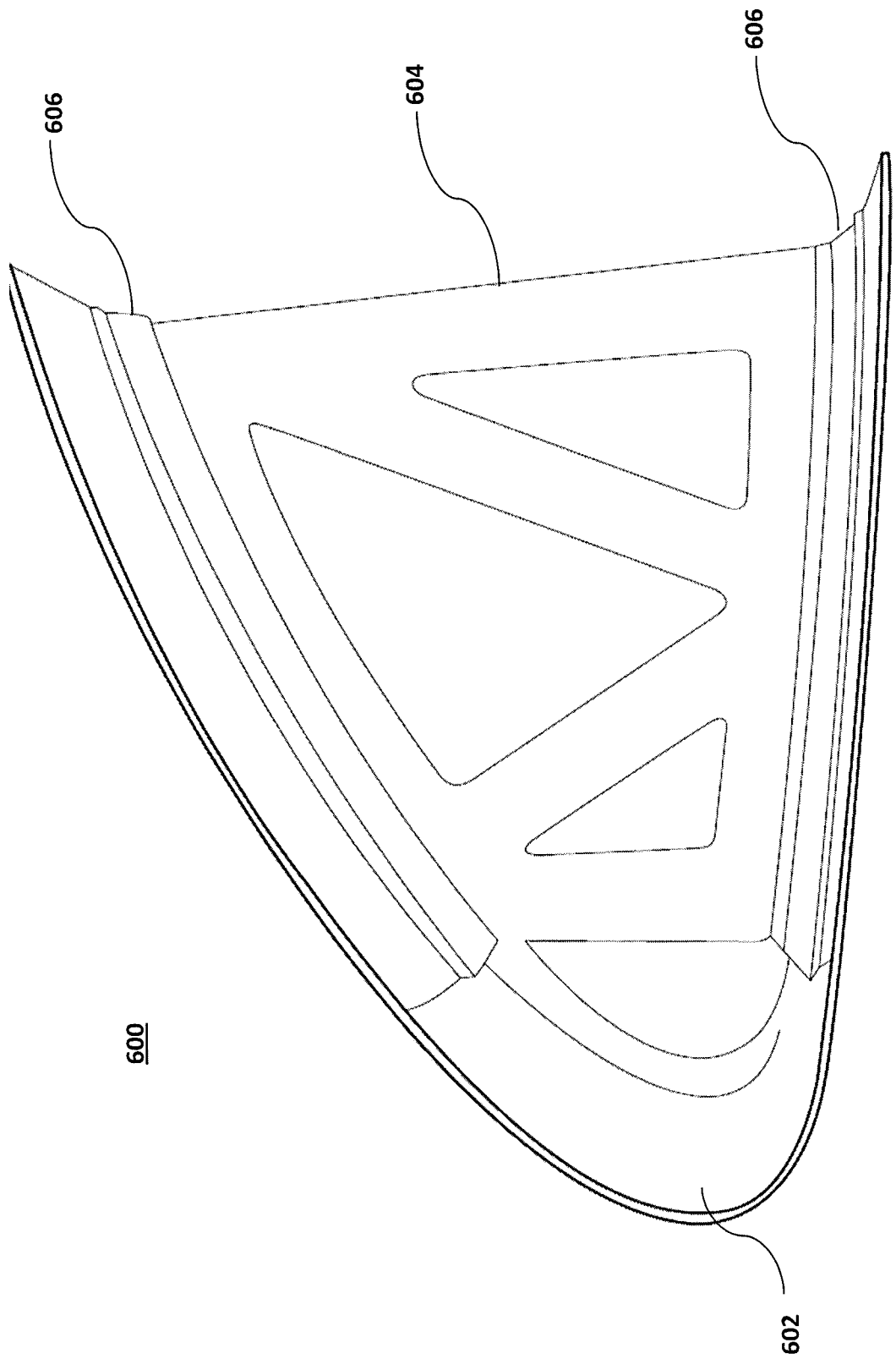
FIGS. 6a through 6c illustrate a second example unitized hybrid structure.
Figure 6B:
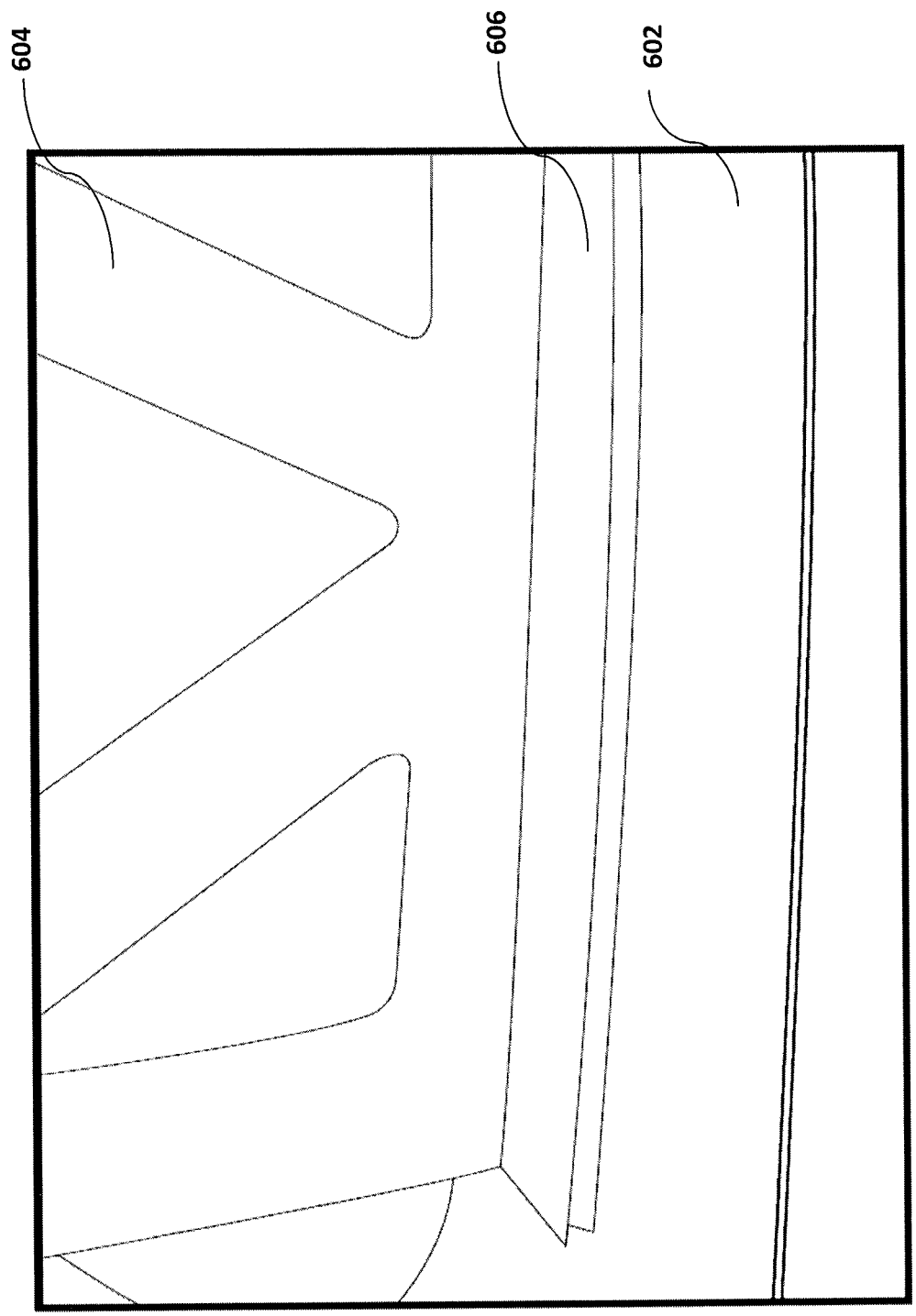
Figure 6C:
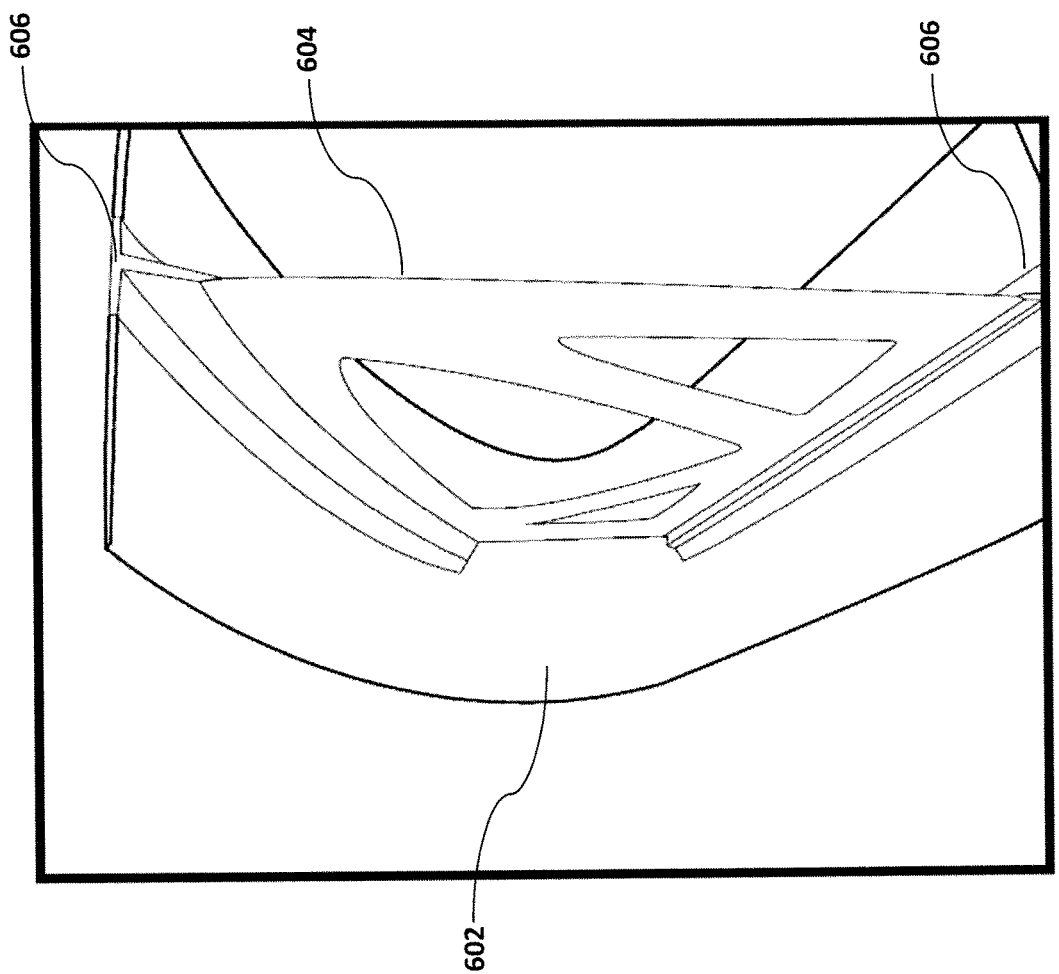

FIGS. 6a through 6c illustrate a second example unitized hybrid structure 600. More specifically, FIGS. 6a through 6c illustrate an airfoil 600 having a GLARE substrate 602 to which other components are bonded to form a hybrid unitized structure. For example, a stiffener 604 may be bonded with the GLARE substrate 602 using a pi-preform 606. For this type of application, the stiffener 604 may be substantially planar with a center portion removed to reduce weight and enable wires, cables and the like to be run along the length of the component. However, to increase strength, the stiffener 604 may be fabricated one or more diagonal straight portions, thereby forming a truss. The stiffener 604 may be fabricated using techniques known in the art to achieve a desired shape or size.

Figure 7A:
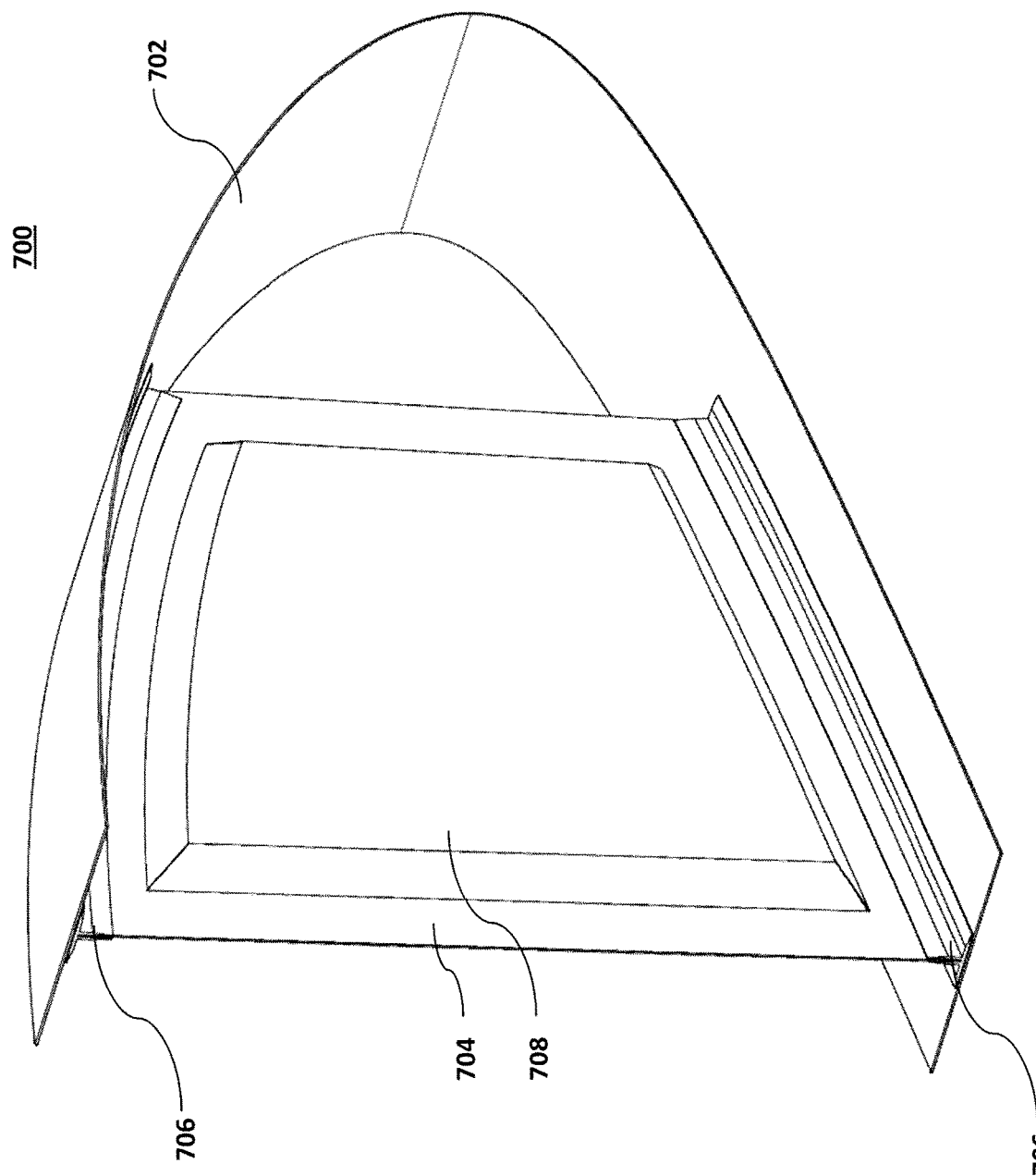
FIGS. 7a and 7b illustrate a third example unitized hybrid structure.
Figure 7B:
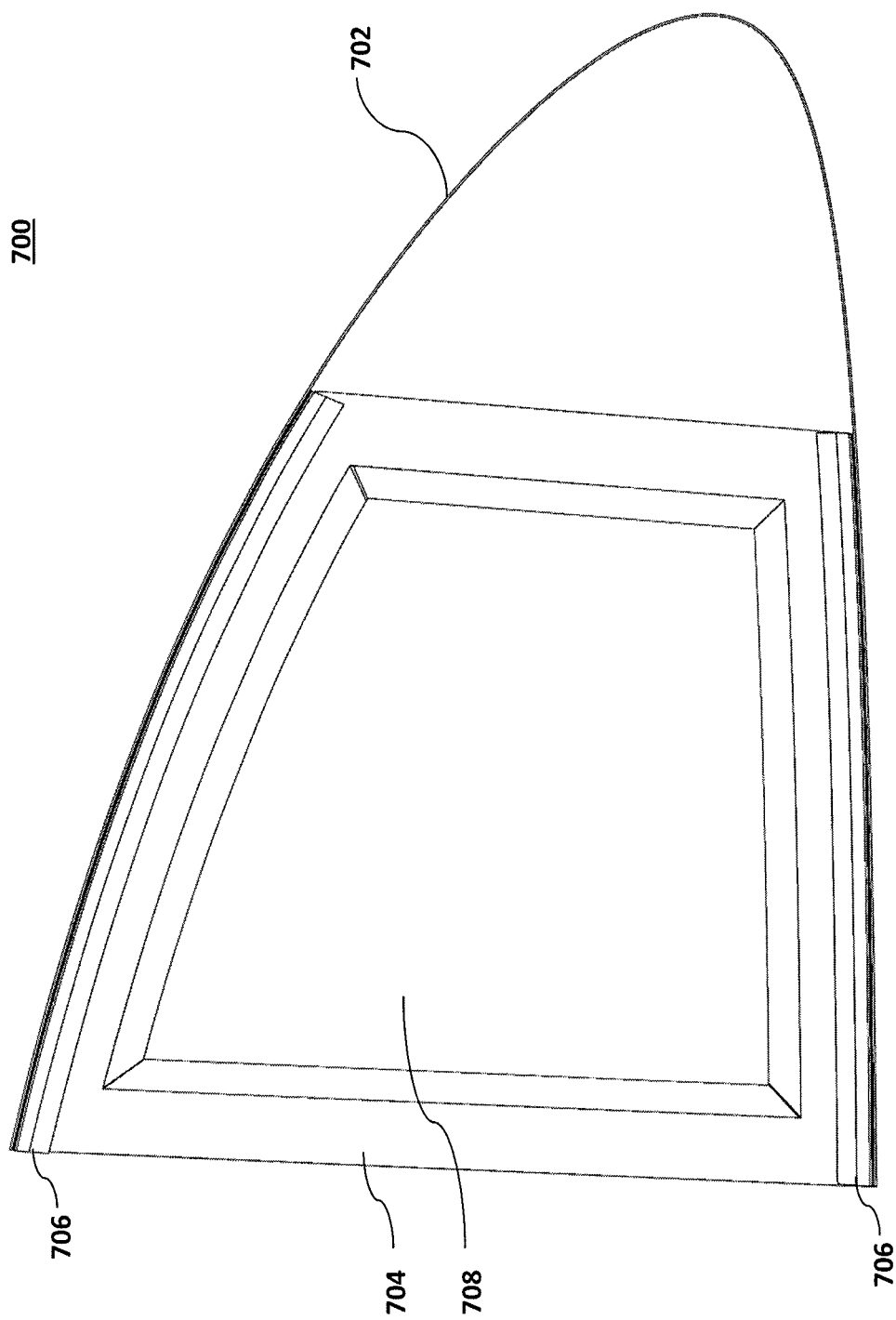

FIGS. 7a and 7b illustrate a third example of a unitized hybrid structure 700. More specifically, FIGS. 7a and 7b illustrate a second airfoil 700 having a GLARE substrate 702 to which other components are bonded to form hybrid a unitized structure. For example, a stiffener 704 with a 708 core may be bonded with the GLARE substrate 602 using a pi-preform 606. Like the stiffener 604 of FIGS. 6a through 6c, the stiffener 704 is substantially planar. However, to provide further stiffness, the stiffener 704 may comprise a core 708. Example cores may include, for example, hexagonal-celled core of various materials or foam core. Specifically, the core 708 can provide additional rigidity during infusion, cure and bond, as well as additional strength and stiffness to the final assembly.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All United States and foreign patent documents, all articles, brochures, and all other published documents discussed above are hereby incorporated by reference into the Detailed Description of the Preferred Embodiment.

What is claimed is:

1. A method of fabricating a composite structure using a pre-cured composite stiffener and a dry fabric component, the method comprising the steps of:
    wrapping an adhesive film around a first edge of said pre-cured composite stiffener;
    wrapping a first resin film around the first edge of said pre-cured composite stiffener, wherein the first resin film covers at least a portion of the adhesive film;
    inserting the first edge of said pre-cured composite stiffener into a clevis of the dry fabric component to form a composite structure assembly, wherein the dry fabric component includes a base portion and the clevis is substantially perpendicular to the base portion;
    applying a second resin film to a first outer surface of the clevis;
    applying a third resin film to a second outer surface of the clevis, wherein the first outer surface and the second outer surface are located on opposite sides of the clevis and the pre-cured composite stiffener;
    securing the pre-cured composite stiffener substantially perpendicularly to the base portion of the dry fabric component, wherein the pre-cured composite stiffener provides structural support to the composite structure assembly;
    placing the composite structure assembly in an oven;
    starting a consolidated infusion and cure process by heating the oven to a first temperature and holding the oven at the first temperature for a first predetermined period of time to infuse the dry fabric component with each of the first, second, and third resin films to yield an impregnated fabric component, wherein the first temperature is between 150 and 200 degrees Fahrenheit and the first predetermined period is between 10 and 25 minutes;
    after the first predetermined period of time, increasing the oven from the first temperature to a second temperature and holding the oven at the second temperature for a second predetermined period of time to cure the composite structure assembly and to form a permanent bond between the pre-cured composite stiffener and the impregnated fabric component, wherein the second temperature is between 200 and 300 degrees Fahrenheit and the second predetermined period is between 250 and 350 minutes, wherein the consolidated infusion and cure process both infuses the dry fabric component and cures the impregnated fabric component in a single cycle; and
    after the second predetermined period of time, decreasing the oven from the second temperature to an ambient temperature.

2. The method of claim 1, further comprising the steps of bonding the composite structure assembly with a substrate component to form a hybrid unitized structure.

3. The method of claim 1, wherein the dry fabric component comprises at least one of: (1) glass-fiber; (2) carbon-fiber; or (3) para-aramid synthetic fiber.

4. The method of claim 1, wherein the first temperature is 175 degrees Fahrenheit and the second temperature is 250 degrees Fahrenheit, wherein the first predetermined period is between 15 and 20 minutes, and the second predetermined period is between 290 and 310 minutes.

5. The method of claim 2, wherein the substrate component comprises Glass Laminate.

6. The method of claim 1, wherein the second and third resin film have a weight that is different than the first resin film.

7. The method of claim 2, wherein the composite structure assembly is also permanently bonded to the substrate component via the base portion during the step of applying the second temperature.

8. The method of claim 7, further comprising the step of applying a fourth resin film and second adhesive film to the base portion before the step of applying the first temperature.

9. The method of claim 1, wherein the dry fabric component is a three-dimensional woven pi-preform.

10. The method of claim 9, further comprising the steps of: (i) wrapping a resin film around a second edge of said pre-cured composite stiffener; and (ii) inserting the second edge of said pre-cured composite stiffener into a clevis of a second three-dimensional woven pi-preform.

11. The method of claim 7, wherein the substrate component is an aircraft skin, and the pre-cured composite stiffener is a planar structure with portions removed, wherein the first edge of said pre-cured composite stiffener defines at least a portion of an airfoil.

12. The method of claim 7, wherein the impregnated fabric component is configured to insulate the pre-cured composite stiffener electrically from the substrate component.

13. The method of claim 1, wherein the first outer surface and the second outer surface reside in planes that are parallel to one another.

14. The method of claim 1, further comprising the step of applying a peel ply to the base portion to maintain a prepared bonding surface.

15. The method of claim 8, further comprising adhering the base portion to an aircraft substrate component to form a composite aircraft structure assembly, wherein the fourth resin film and the second adhesive film are positioned between the base portion and the aircraft substrate component.

16. The method of claim 15, wherein the pre-cured composite stiffener provides structural support to the composite aircraft structure assembly.

17. The method of claim 1, wherein the pre-cured composite stiffener comprises an L-shaped cross-section.

18. The method of claim 1, wherein the pre-cured composite stiffener comprises a J-shaped cross-section.

19. The method of claim 10, wherein the pre-cured composite stiffener comprises a hat-shaped cross-section.

* * * * *